US012572449B2

(12) United States Patent
Mont-Reynaud et al.

(10) Patent No.: US 12,572,449 B2
(45) Date of Patent: Mar. 10, 2026

(54) VIRTUAL ASSISTANT DOMAIN SELECTION ANALYSIS

(71) Applicant: SoundHound AI IP, LLC, Santa Clara, CA (US)

(72) Inventors: Bernard Mont-Reynaud, Sunnyvale, CA (US); Jonah Probell, Alviso, CA (US)

(73) Assignee: SoundHound AI IP, LLC, Santa Clara, CA (US)

( * ) Notice: Subject to any disclaimer, the term of this patent is extended or adjusted under 35 U.S.C. 154(b) by 483 days.

(21) Appl. No.: 16/213,020

(22) Filed: Dec. 7, 2018

(65) Prior Publication Data

US 2020/0183815 A1 Jun. 11, 2020

(51) Int. Cl.
*G06F 11/3668* (2025.01)
*G06F 9/451* (2018.01)
*G06Q 30/0283* (2023.01)

(52) U.S. Cl.
CPC .......... *G06F 11/3688* (2013.01); *G06F 9/453* (2018.02); *G06Q 30/0283* (2013.01)

(58) Field of Classification Search
CPC .... G06Q 10/10; G06Q 10/06; G06Q 10/0635; G06Q 10/101; G06Q 10/103; G06Q 30/0185; G06Q 30/0201; G06Q 40/02; G06Q 50/01; G06Q 10/02; G06Q 10/04; G06Q 10/06311; G06Q 10/063112; G06Q 10/063114; G06Q 10/063116; G06Q 10/06313; G06Q 10/06395; G06Q 10/083; G06Q 10/087; G06Q 10/1053;
(Continued)

(56) References Cited

U.S. PATENT DOCUMENTS 9,489,625 B2 * 11/2016 Kalns ........................ G06N 5/02
11,580,350 B2 * 2/2023 Wu ........................... G06N 3/08
(Continued)

FOREIGN PATENT DOCUMENTS

CN 103988168 8/2014
CN 105453080 3/2016
(Continued)

OTHER PUBLICATIONS

CodeCanyon; Nov. 10, 2018; pp. 1-5; https://codecanyon.net/category/plugins (Year: 2018).*
(Continued)

*Primary Examiner* — Jeff Zimmerman
*Assistant Examiner* — Jorge G Del Toro-Ortega
(74) *Attorney, Agent, or Firm* — HAYNES BEFFEL & WOLFELD LLP; Ernest J. Beffel, Jr.; Andrew L. Dunlap

(57) ABSTRACT

A virtual assistant platform provides a user interface for app developers to configure the enablement of domains for virtual assistants. Sets of test queries can be uploaded and statistical analyses displayed for the numbers of test queries served by each selected domain and costs for usage of each domain. Costs can vary according to complex pricing models. The user interface provides display views of tables, cost stack charts, and histograms to inform decisions that trade-off costs with benefits to the virtual assistant user experience. The platform interface shows, for individual queries, responses possible from different domains. Platform providers promote certain chosen domains.

14 Claims, 18 Drawing Sheets

(58) Field of Classification Search
    CPC ............. G06Q 20/085; G06Q 20/3821; G06Q
            30/0204; G06Q 30/0205; G06Q 30/0215;
            G06Q 30/0224; G06Q 30/0236; G06Q
            30/0269; G06Q 30/0276; G06Q 30/0605;
            G06Q 30/0609; G06Q 30/0611; G06Q
            30/0627; G06Q 30/0641; G06Q 30/08;
            G06Q 40/08; G06Q 40/12; G06Q 50/00;
                                          G06Q 50/22
    See application file for complete search history.

(56) References Cited

U.S. PATENT DOCUMENTS

| | | | | |
|---|---|---|---|---|
| 11,900,072 | B1 * | 2/2024 | Bossio | ................ G06F 3/04883 |
| 2007/0200850 | A1 * | 8/2007 | Shah | ..................... G06F 16/951 |
| | | | | 707/999.107 |
| 2013/0110519 | A1 * | 5/2013 | Cheyer | ............... H04M 1/7243 |
| | | | | 704/275 |
| 2013/0268522 | A1 | 10/2013 | Barrett | |
| 2014/0244712 | A1 | 8/2014 | Walters et al. | |
| 2016/0314447 | A1 * | 10/2016 | Trevathan | ............. G06F 21/105 |
| 2016/0335138 | A1 | 11/2016 | Surti | |
| 2016/0349935 | A1 * | 12/2016 | Gelfenbeyn | ....... G06Q 30/0601 |
| 2017/0154628 | A1 * | 6/2017 | Mohajer | ............. G06Q 20/102 |
| 2018/0121508 | A1 | 5/2018 | Halstvedt | |

FOREIGN PATENT DOCUMENTS

| | | | |
|---|---|---|---|
| JP | 2001297261 | A | 10/2001 |
| JP | 2003256211 | A | 9/2003 |
| JP | 2004117284 | | 4/2004 |
| JP | 2015225402 | A | 12/2015 |
| JP | 2020067917 | A * | 4/2020 |
| JP | 2021176092 | A | 11/2021 |
| KR | 2009-0091357 | | 8/2009 |
| KR | 2010-0086489 | | 7/2010 |
| KR | 1020100086489 | A | 7/2010 |
| KR | 20130132698 | A | 12/2013 |
| WO | 2016114922 | A1 | 7/2016 |
| WO | WO2016/114922 | | 7/2016 |

OTHER PUBLICATIONS

Microsoft; "Cognitive Services Pricing-Language Understanding Intelligent Services"; Dec. 15, 2017; pp. 1-9; https://azure.microsoft.com/en-us/pricing/details/cognitive-services/language-understanding-intelligent-services/ (Year: 2017).*
Li Li, Dahl Deborah A, Norton Lewis M, Linebarger Marcia C, Chen Dongdong. A test environment for natural language understanding systems. InProceedings of the 17th international conference on Computational linguistics—vol. 2 Aug. 10, 1998 (pp. 763-767). Association for Computational Linguistics.
Liu Xiaohu, Celikyilmax Asli, Sarikaya Ruhi. Natural language understanding for partial queries. InAutomatic Speech Recognition and Understanding (ASRU), 2015 IEEE Workshop on Dec. 13, 2015 (pp. 397-400). IEEE.
Oracle, Oracle Virtual Assistant: Using Oracle Virtual Assistant, 2017, p. 12.
English language Abstract for CN103988168 published Aug. 13, 2014.
English language Abstract for CN105453080 published Mar. 30, 2016.
English language Abstract for JP2004117284 published Apr. 15, 2004.

* cited by examiner

Figure 2:
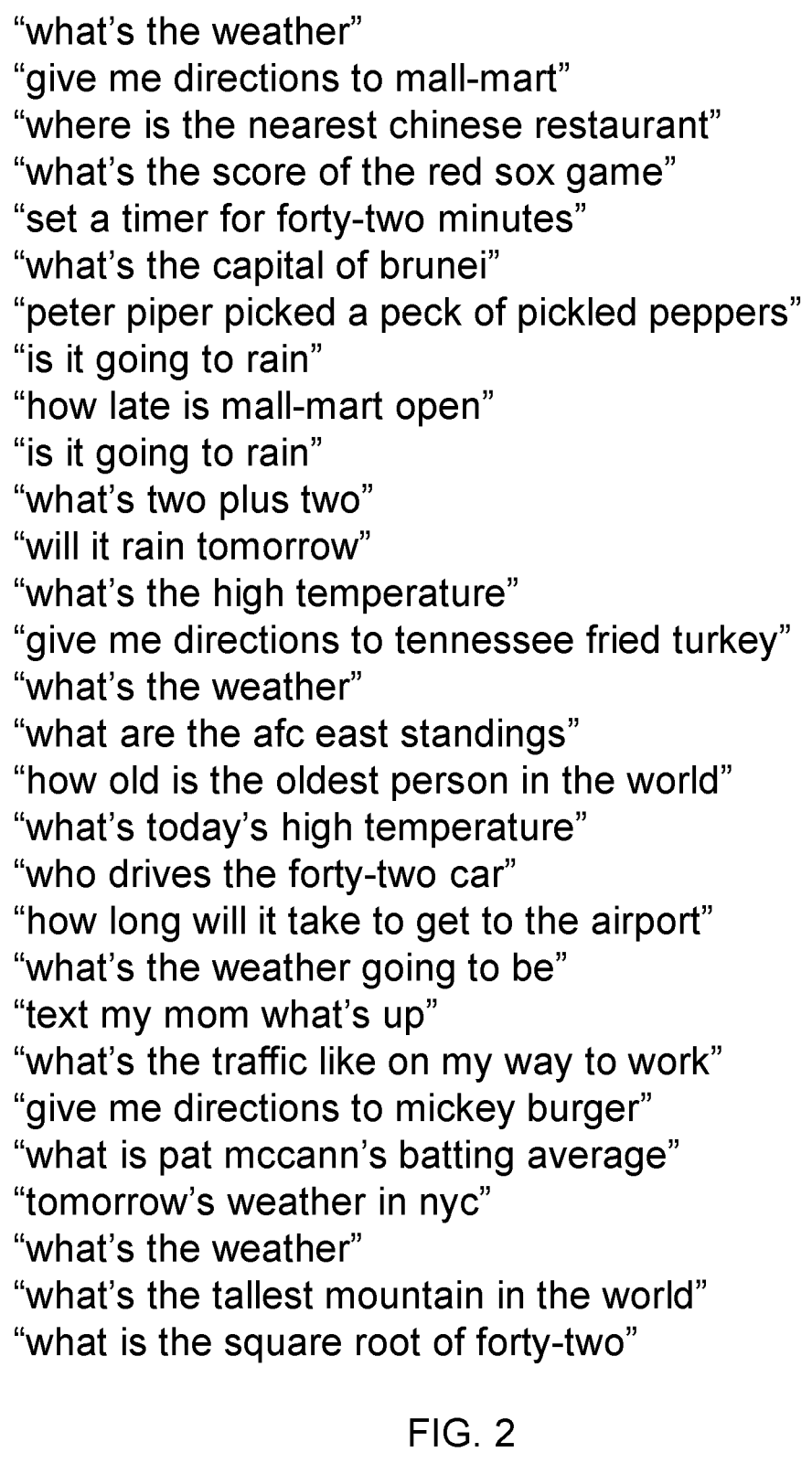

"what's the weather"

"give me directions to mall-mart"

"where is the nearest chinese restaurant"

"what's the score of the red sox game"

"set a timer for forty-two minutes"

"what's the capital of brunei"

"peter piper picked a peck of pickled peppers"

"is it going to rain"

"how late is mall-mart open"

"is it going to rain"

"what's two plus two"

"will it rain tomorrow"

"what's the high temperature"

"give me directions to tennessee fried turkey"

"what's the weather"

"what are the afc east standings"

"how old is the oldest person in the world"

"what's today's high temperature"

"who drives the forty-two car"

"how long will it take to get to the airport"

"what's the weather going to be"

"text my mom what's up"

"what's the traffic like on my way to work"

"give me directions to mickey burger"

"what is pat mccann's batting average"

"tomorrow's weather in nyc"

"what's the weather"

"what's the tallest mountain in the world"

"what is the square root of forty-two"

| domain | enabled | query count | pricing model | domain cost |
|---|---|---|---|---|
| weather | ✓ | 4536 | 1 ¢ | $45.36 |
| food | | 1955 | 3 ¢ | 0 |
| sports | ✓ | 1403 | 2 ¢ | $26.06 |
| map | | 764 | 5 ¢ | 0 |
| facts | ✓ | 520 | 1 ¢ | $5.20 |
| timer | ✓ | 166 | 0 | 0 |
| math | ✓ | 23 | 0 | 0 |
| *missed* | *n/a* | *633* | *n/a* | *n/a* |
| Query Success | | 73% | TOTAL | $76.62 |

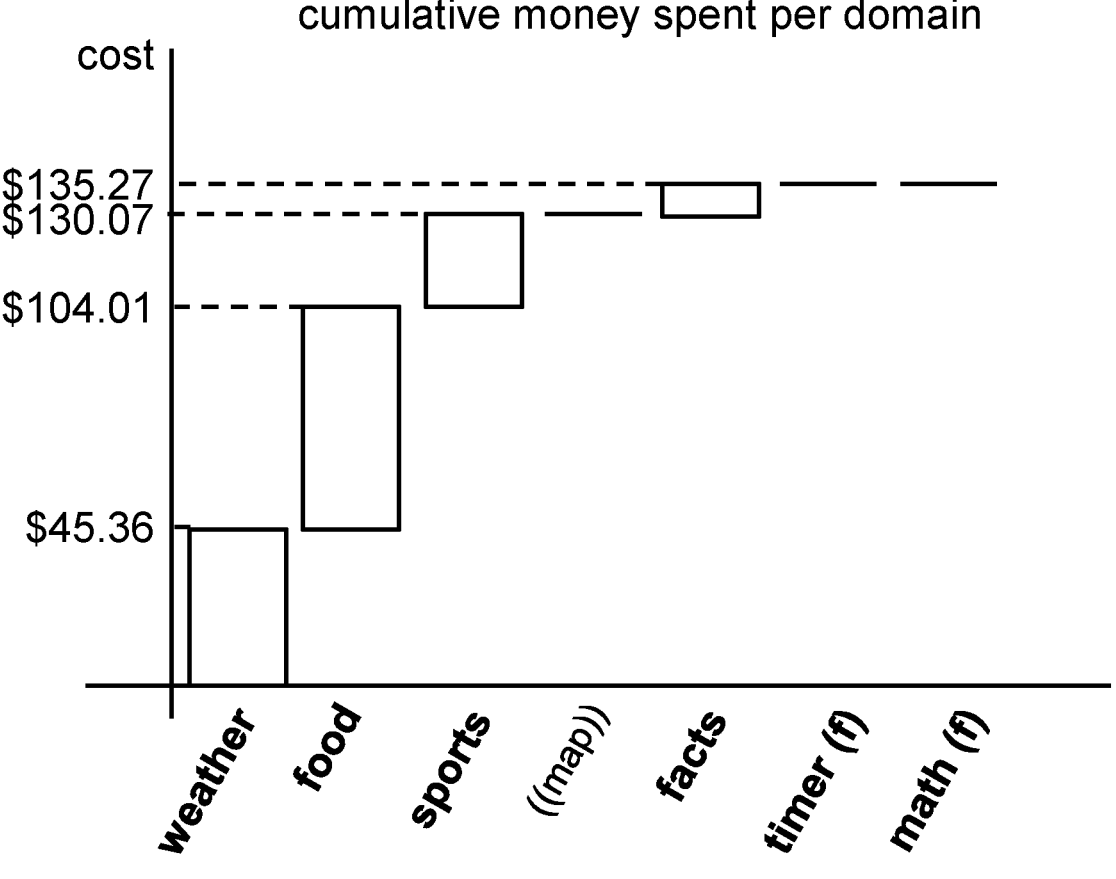
FIG. 10

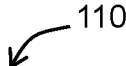
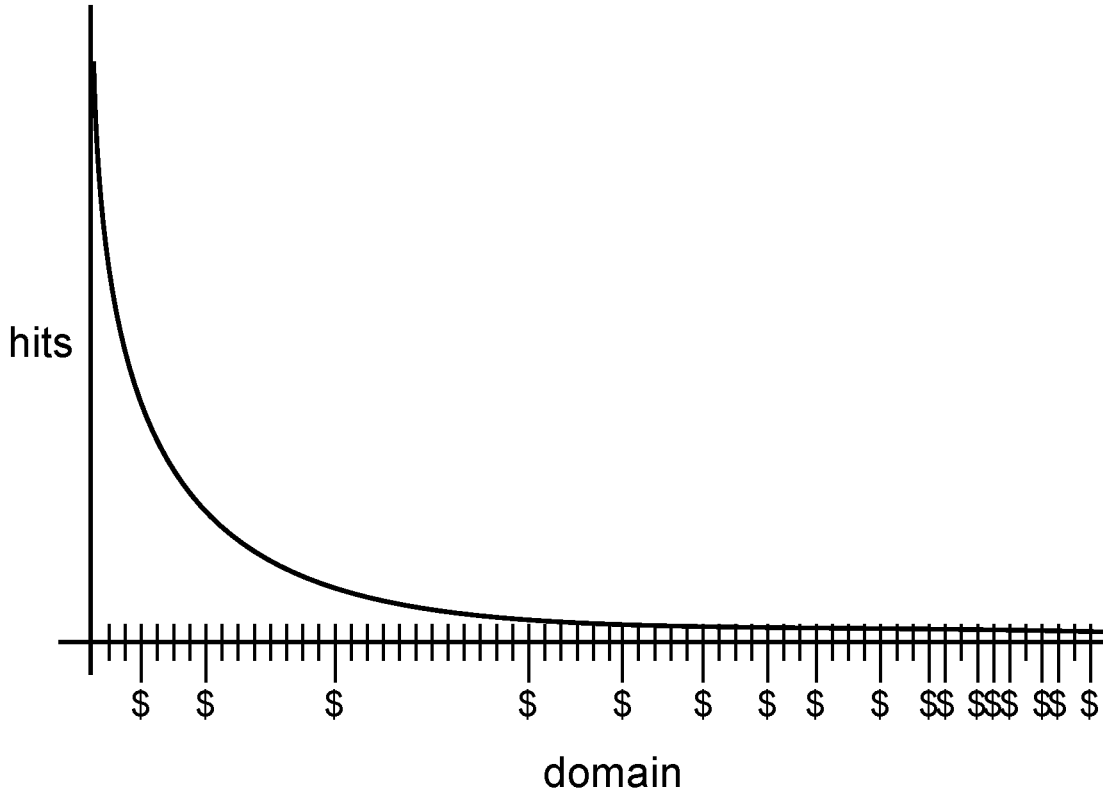
FIG. 11

| domain | enabled | query count | pricing model | domain cost |
|---|---|---|---|---|
| weather | ✓ | 4536 | 1¢ | $45.36 |
| food | | 1955 | 3¢ | 0 |
| sports | ✓ | 1403 | 2¢ | $26.06 |
| mapPRO | | 805 | 12¢ | 0 |
| map | | 764 | 5¢ | 0 |
| facts | ✓ | 520 | 1¢ | $5.20 |
| timer | ✓ | 166 | 0¢ | 0 |
| math | ✓ | 23 | 0¢ | 0 |
| missed | n/a | 612 | n/a | n/a |
| Query Success | | 73% | TOTAL | $76.62 |

140

Query                    142                                                    141 show me hotels in paris | upload    click to upload a query file
                         or
144        drag a file to the query box

*speak your query*

143

Results                    145

| Domain | Cost | Response |
|--------|------|----------|
| Editor's Picks – Sponsored | | 146 |
| Trip Booker | 1¢ | Trip Booker recommends the Big Brand hotel near the Eiffel Tower |
| *Other* | | 147 |
| Travel Mate | 3¢ | more than 100 hotels found, here are the top 5 [[list]] |
| TravelHound | 8¢ | here are the three top-rated out of 765 hotels found in paris [[list]] would you like more listings or to sort or filter the list such as by price or available dates? |
| Chee-po-tels | 1¢ | no hotels found in paris idaho |

FIG. 14

Linear Pricing Model
$.0005 per request

FIG. 15A

Piecewise Linear Pricing Model
$.0010 for the first 10,000 requests
$.0005 for the next 50,000 requests
$.0002 for the next 250,000 requests
$.0001 for any more requests
resetting every month

FIG. 15B

Formula-Based Pricing Model $$\$.0001 + \frac{\$.0025}{\log_{10}(requests\ in\ past\ 30\ days)}\ \text{per request}$$

VIRTUAL ASSISTANT DOMAIN SELECTION ANALYSIS

BACKGROUND

Increasing numbers of people use virtual assistants such as SoundHound Hound, Google Assistant, Amazon Alexa, 百度度秘, Apple Siri, Line/Naver Clova, Microsoft Cortana, KT Giga Genie, SK Telecom NUGU, and open source Mycroft. First generation virtual assistants were available only on computers, smartphones, or home speaker devices branded by the company providing the virtual assistant capabilities. They were not configurable, and only supported the custom capabilities the company had internally developed.

Current virtual assistants may be text-enabled. They can understand written natural language text and make natural language written responses. Some embodiments are speech-enabled. They understand spoken natural language and may respond in modalities such as text, synthesized speech, images, graphic animations, audio and video clips, and so on.

SUMMARY

Companies that make and sell applications (apps) or devices, such as cars, robots, shopping kiosks, and appliances that include a virtual assistant ("VA"), do not necessarily want to invest into creating a VA on their own "from scratch." They want to flexibly integrate pre-existing natural language functionality as part of a custom virtual assistant of their own. They find it frustrating to be unable to configure virtual assistants specifically for their own requirements.

Domains are the units of natural language functionality. They are characterized by the set of sentences they can interpret, and by their ability to respond and act upon the interpretation of the recognized sentences. Example domains include a weather domain, which answers questions about the weather and a calendar domain, which allows a user to setup and manage appointments, i.e., to request actions as well as asking questions.

Some VA development platforms ("platforms"), such as, e.g., SoundHound Houndify, support the developers of virtual assistants ("VA developers") by providing a menu of domains, available in a development platform. In such a platform, VA developers select domains for inclusion in a custom virtual assistant of their own design including an array of domains that are already known to the platform. Some embodiments provide for using such a platform to configure a virtual assistant. Some embodiments comprise such a platform. In some embodiments, a platform provides an interface for domain providers to offer their domains for integration in a virtual assistant. The information provided by domain providers is sufficient to support the domain's functionality in a virtual assistant that selects the domain. In some embodiments, some domains are free of charge. In some embodiments, a provided domain has an associated charge for its usage. In various embodiments, payments are made to domain providers, either by the platform provider, or by other parties such as a VA developer, a user, or a VA developer via the platform provider. In some embodiments, a platform provider promotes certain domains over others.

Some embodiments provide for VA developers to input test queries for a virtual assistant and test how the virtual assistant would behave in response to these queries. Some embodiments provide for showing and comparing the virtual assistant's behavior under different conditions of different domains selected from a menu of domains.

Some embodiments provide for VA developers to input large sets of test queries. Some embodiments display views of an analysis of the virtual assistant's behavior in response to the set of test queries, and to a selection of domains. Some embodiments provide for analyzing the cost associated with responding to all the queries in the set. Some embodiments provide for analyzing the portion of test queries in the set that the virtual assistant can interpret.

Some embodiments provide display views for analyzing rates of successful interpretation of queries in a set and costs under conditions of different selections of domains. Some embodiments provide a tabular view of domain results. Some embodiments provide a pricing model for each domain. Some embodiments provide typical queries recognized by each domain. Some embodiments provide a set of test queries and the total cost for responding to queries from a set of test queries. Some embodiments provide a cost stack view of costs for each domain for responding to the queries in a test set. Some embodiments provide a histogram view of queries responded to per domain. Some embodiments indicate that some domains are free of charge and others have a cost.

Some embodiments provide a graphical user interface with a pointer icon. In some such embodiments, when the pointer is located over certain parts of a display view, corresponding information is displayed in a pop-up message.

Some embodiments provide for sorting or filtering a menu of domains according to useful criteria. Some embodiments provide for displaying different domains in a menu in different ways such as with background colors, text colors, fonts, and typestyles.

Some embodiments provide for parameterized pricing models for domains, such as linear, piecewise linear, or formula-based pricing models. Some such embodiments provide tools to assist a VA developer in making cost-effective choices of domains.

Some embodiments are computer readable media. Some embodiments are cloud servers. Some embodiments are mobile devices. Some embodiments are systems of devices in communication with cloud servers. Some embodiments are self-contained devices implementing natural language virtual assistants configured by a platform.

BRIEF DESCRIPTION OF THE DRAWINGS

FIG. 2 shows a set of test queries.

FIG. 10 shows a cost stack chart for a selection of enabled domains for a set of test queries, in an embodiment.

FIG. 11 shows a histogram of queries from a set of test queries responded to by each of a selection of enabled domains, in an embodiment.

FIG. 14 shows a display for entering a test query and seeing a filtered menu of domains that can respond to the query and their responses.

FIG. 15A shows a linear pricing model.

FIG. 15B shows a piecewise linear pricing model.

FIG. 15C shows a formula-based pricing model.

DETAILED DESCRIPTION

Figure 1:
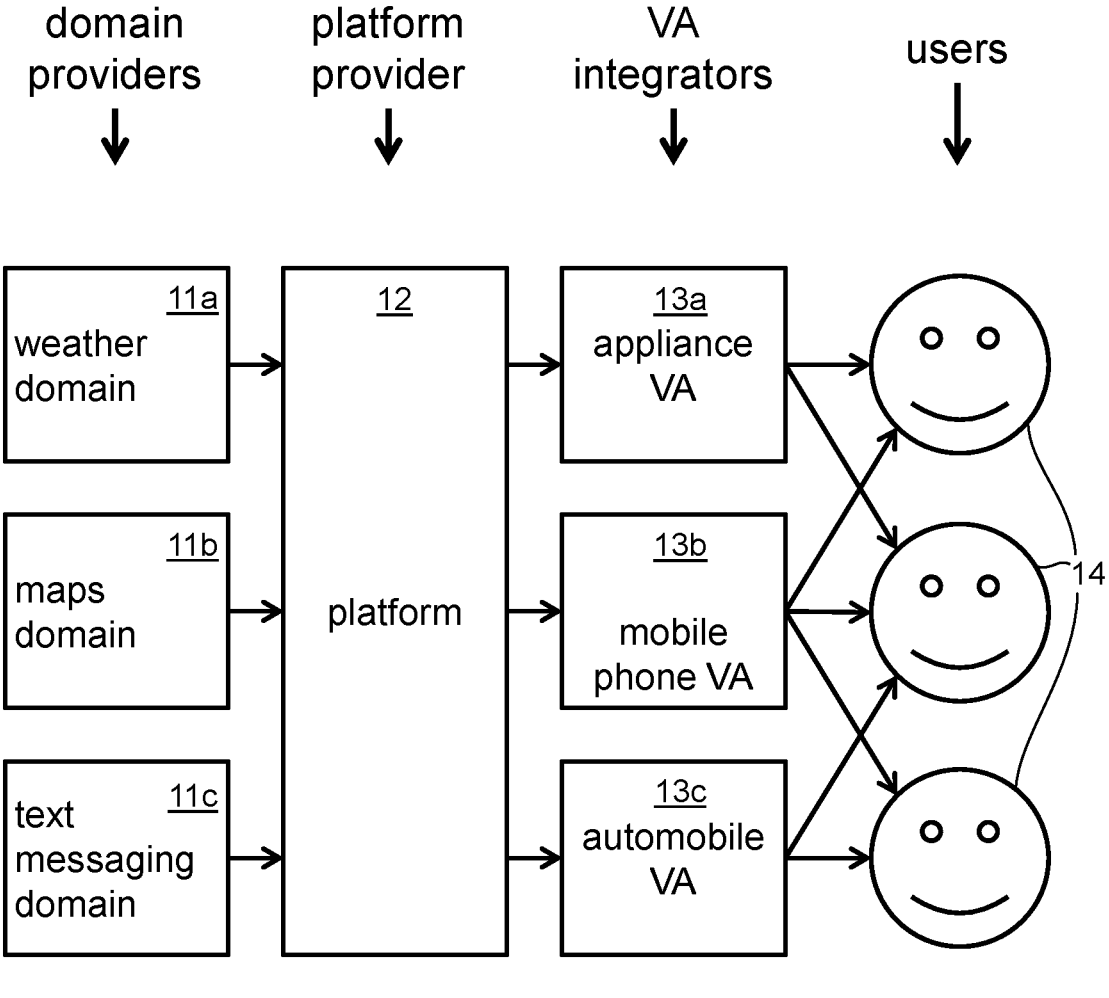
FIG. 1 shows information flow from domain providers, through a platform provider, through VA developers, and to users, in an embodiment.

The following describes various embodiments of the present invention that illustrate various features. Generally, embodiments can use the described features in any combination.

Many companies make or sell devices or apps that can be improved by integrating virtual assistants. Many virtual assistants are speech-based. Examples of speech-enabled devices are cars, robots, shopping kiosks, appliances, and smartphones. All of them can have integrated virtual assistants. Users communicate with virtual assistants by issuing natural language queries, which are usually either requests for information or requests for action. Queries may be spoken or written. Responses from the virtual assistant may include speech, text, graphics, audio, or video recordings, as well as actions.

The development of intelligent multi-function virtual assistants is complex and requires, besides a general architecture, specialized expertise and investment for every domain that the virtual assistant can handle. When developing a virtual assistant, it makes sense for the developer to buy or in-license domain software from a virtual assistant development platform provider. This allows the platform providers to hire enough experts to build a superior platform and the various VA developers to share the cost.

In such an ecosystem, the logic or software to implement the virtual assistant is stored on computer-readable media either within a network-connected server operated by the platform provider or within a device that need not be connected to a network, the device logic or software having been configured using the platform. In typical network-connected embodiments, client apps or remote devices access a server, via the Internet, using application programming interfaces ("APIs"). Some single-device virtual assistants work autonomously, some work only with network access, and some work with intermittent network access by combining local and remote virtual assistant capabilities. Whether connected or not to a network, virtual assistants receive natural language queries from users, interpret the queries, and provide responses to the user. Zero or one or more domains may recognize each query. In case of ambiguity, the virtual assistant chooses one of the competing domains to determine its response.

Virtual assistant developers are people (in most cases, trained engineers) who work for companies that integrate virtual assistants into their specific devices and apps. VA developers use platforms to configure virtual assistants for their specific requirements. Virtual assistants typically support multiple domains. Some domains provide information such as weather, news, trivia, restaurant search, simple math, and Wikipedia lookups. Some domains provide services such as controlling thermostats or lighting, streaming music, sending SMS text messages, and managing calendar appointments. Some domains can be as simple as just telling the time. Some domains can be complex, such as providing travel agent services, and some are highly valuable to users, such as an ability to find the location of a child. Many domains access web APIs to access specific information or dynamic information or to cause requested actions. Some domains provide information and services from third-party providers in exchange for payment. For example, some weather domains access national weather service APIs to get weather report information.

Platforms, among other functions, provide VA developers with ways to select domains for inclusion in their virtual assistants. Domains are generally provided by domain provider entities. Some platforms support thousands of third-party domain providers. Some domain providers are small companies or even individual programmers.

In some embodiments, the set of queries recognized by a domain are defined by semantic grammar code. Such grammar code is created specifically for each domain by a domain developer (in most cases, a trained engineer) who creates rules for interpreting queries as a specific request for information or a specific request for action. In such embodiments, natural language interpretation is based on domain grammar code. A domain grammar comprises syntactic rules used by a natural language processing system to parse queries. In the domain grammar, syntactic rules are augmented by semantic augments. An augment is a function that constructs the interpretation of a constituent from the interpretation of zero or more sub-constituents, where the sub-constituents are determined by syntactic parsing. In some embodiments, a domain grammar is used to recognize and interpret queries for a domain. In some embodiments, at least parts of the interpreter involves neural networks, trained using machine learning. In either case, an interpretation of a query assigns values to semantic slots, based on information from the query. Some embodiments encode an intent slot, which expresses the user's overall intent for the query, such as scheduling a meeting or reserving a flight.

In an example embodiment, a semantic grammar for requesting weather reports might have (1) a constituent whose syntactic component is named <location>, with a corresponding semantic slot named Location, whose value must qualify as a location in every instance; and (2) another constituent whose syntactic component is named <time>, with a corresponding semantic slot named Time, whose value must qualify as a time. When a user asks, "what's the weather in Timbuktu tomorrow", this embodiment could use a weather domain grammar with <location> and <time> components, fill an Intent slot with the value "weather-_info", a Location slot with the value "Timbuktu" and a Time slot with the value "tomorrow", or perhaps with the corresponding calendar date.

Similarly, if the user says, "where is the nearest French restaurant with at least 4 stars" the system could use a restaurant domain grammar with syntax rules for <cuisine-_type> and <star rating> components, and corresponding slots for CuisineType and StarRating would be filled with values that respectively convey "French cuisine" and "at least 4 stars". For another example, if a user says, "text mom I love you", the system could recognize the query with a SMS texting domain grammar, fill an Intent slot with "Send-_Text", a Recipient slot with a reference to the contact in the user's contacts list that corresponds to "mom," and a Message slot with "I love you." An interpretation of the query would be formed with these slots, and the fulfillment of the query's interpretation, specified by the Intent, would be to send the text contents of the Message to the cell phone of the Recipient. If a user says, "how many claws does a cat have", the system might recognize a knowledge domain query, fill an Intent slot with (say) "WikipediaLookup", a Species slot with "cat", an Attribute slot with "claws", and a Question slot with "how many". Other approaches to natural language are possible.

Some queries can be interpreted by multiple domains. It is common to have such overlapping grammars when different domain providers compete to provide the same domain functionality. For example, a platform might offer four competing domains for making hotel reservations, all of which can interpret the query, "show me hotels in Paris". To help a VA developer deal with this situation, the platform can configure a virtual assistant to include certain domains and not others in its capabilities or to choose certain domains in preference to other domains. Such choices can be made in a "hard" way or a "soft" way.

Hard choices are made at configuration time. Some domains are enabled in the virtual assistant, and all other domains are disabled. This configuration step allows a VA developer to control what domains will be involved in the interpretation of queries at runtime. In production, query interpretation only considers enabled domains.

Soft choices are made at runtime. A choice between competing domain interpretations of a query (all of whose domains are enabled) is typically made by selecting the highest scoring interpretation based on a scoring scheme. A scoring technique can be used to prioritize domains. I.e., if enabled domains A and B compete to interpret a query, domain A can always be given priority over B. Scoring can also address cases of ambiguity among unrelated domains, although such semantic collisions are less frequent. For example, the query, "how high is Denver" can be interpreted by a geographical facts domain that knows the altitudes of cities, but it can also be interpreted by a weather domain, in which "high" refers to temperature. The second interpretation may be unlikely in the absence of context, but it is quite likely in a weather and temperature context in the conversation, such as "What is the weather in Chicago? [Answer: 56 degrees] How high is Denver?". Parsing and interpretation scores may be context-sensitive, and scoring can take into account all of these, as well as domain priorities.

For the choice of effective configurations, a platform can provide empirical tools intended to support VA developers in making judicious decisions. In some embodiments, the cost effectiveness of a domain can be measured with respect to a test set of queries in terms of: (1) coverage, that is, what fraction of the queries is recognized by the domain; (2)

correctness, that is, what fraction of the recognized queries is correctly interpreted by the domain; and (3) cost considerations.

Regarding cost, according to some embodiments, a platform is aware of a pricing model associated with each domain and can provide pricing information to VA developers. Many platforms will provide certain domains for free, such as domains to tell time or do simple math. However, many domain providers offer high-value domains and want to be compensated for using their data and services. For example, a domain for trading stocks can charge a commission for each stock trade requested by a user. In some virtual assistants, the user pays the VA developer for using a domain, and VA developers pay the domain provider either directly or through a platform. In some cases, platforms may mark up the cost of a domain to recover the value that they add.

In practice, platforms or VA developers may discount or subsidize certain domains in order to attract more customers. In a pricing model, the price per query is often the object of a volume discount. All such considerations can be part of the pricing model for a domain.

Coverage and correctness are measured based on sets of test queries received by the platform from a VA developer. A "hit" is registered when an enabled domain recognizes a query. A test query is "covered" if it hits at least one enabled domain. Coverage is measured (in the absolute) by the number of test queries that are covered, or (in a relative sense) by the corresponding portion of the test queries. Correctness is measured (in the absolute) by the number of test queries that are correctly handled, or (in a relative sense) by the corresponding portion of the covered test queries. Correctness can be measured when the test set includes query interpretation data, or when it includes query data.

In some embodiments, testing correctness requires interpreting a test query, as would be done for a user query in production but does not require the test query to be executed (fulfilled). Correctness is based on equality (or matching compatibility) of the interpretations (which are the internal representations of the meaning of the query). In some embodiments, testing correctness requires both interpreting and fulfilling the test query. Correctness is then based on equality (or matching compatibility) of the responses In some embodiments, a VA developer can enter a test query, as if it was received from a user, and the platform can indicate to the VA developer one or more of: (1) what domains are able to recognize the query; (2) the query's interpretation; (3) the information needed to fulfill the interpretation and respond to the query, and (4) the cost of providing the response.

In some embodiments, VA developers enter a large set of test queries and the platform provides statistical information about the domains that the set of queries would hit and the cumulative costs for the test set. In some embodiments, a query may hit multiple domains. In other embodiments, the system ensures that there is no more than one hit per query. One type of statistical information is a histogram of hits per domain across the set of queries. Another type of statistical information is a table having one or more of: domain names; whether each domain is enabled for a virtual assistant; a pricing model for accessing each domain (such as a simple cost per query); the number of queries in the test set that hit each domain; the resulting cost attributable to having the domain enabled in the virtual assistant; the portion of queries in the test set that would hit at least one of the enabled domains; and the total cost for handling all queries in the test set, using the enabled domains.

It is possible for some queries to require information from more than one domain. For example, a query, "what's the weather in the home city of the team that won the last super bowl game" would require a virtual assistant to use a sports information domain to find what team won the last super bowl game and their home city, then use the city information to look up weather information using a weather domain. Hence, the number of domains hit by a virtual assistant responding to a set of test queries can be greater than the number of queries, and the cost of queries larger than if each test query hit only one domain.

Some queries are not recognized by any domain. In some embodiments, such a failed query is responded to with default information, such as the results of a web search. As a result, the number of hits can also be less than the number of queries.

In general, the more domains that a virtual assistant has, the more queries it can respond to in a satisfactory way. The more satisfied users are with a virtual assistant, the more users will use it. The more users use a virtual assistant, the more incentive domain providers have to create and improve domains. This creates a virtuous cycle of ever-improving domains and virtual assistants that benefits users and creates profit for all participating companies.

Following are descriptions of certain representative embodiments illustrated in drawings.

The Parties

FIG. 1 shows a diagram of a virtual assistant ecosystem and its operation. Different domain providers provide their information and services to a platform 12. Specifically, a weather information domain provider provides weather domain 11*a*; a map information domain provider provides maps domain 11*b*; and a text messaging domain provider provides text messaging domain 11*c* to platform 12. Besides domain grammars, the information provided to the platform may include a pricing model and test data.

VA developers use the platform 12 to create virtual assistants such as an appliance 13*a*, a mobile phone 13*b*, and an automobile 13*c*, all of which deliver VA capabilities to a plurality of users 14. Some users use more than one kind of virtual assistant. Information and services generally flow left to right from domains, via a platform, and through a VA to reach users.

Generally, payments flow in the opposite direction. In various embodiments, users pay VA developers, platform providers, or domain providers directly. In various embodiments, VA developers pay platform providers or domain providers directly. In some embodiments, platform providers pay domain providers. In some embodiments, platform providers offer discounts to virtual assistant developers or provide access to some domains at a loss in order to win business or increase overall usage. In some embodiments, domain providers pay or provide discounts to platform providers in exchange for platform providers promoting their domains. The technology disclosed herein does not restrict the business relationships that are possible using the framework.

In some embodiments, a company is both a domain provider and a virtual assistant developer. For example, an automobile's virtual assistant needs its own local domain to answer status queries about the car, such as its fuel level, or request actions such as turning on the headlights. This is in addition to possibly including external domains such as one with weather information. For another example, a video player set-top box sold by a specific video content provider needs to be able, as part of its custom virtual assistant, to access a domain for retrieving its video content. This domain may be local or external. In some embodiments, some domains are exclusive to some virtual assistants and unavailable to other virtual assistants.

FIG. 2 shows an example set of queries that are typical for general-purpose virtual assistants. Queries about the weather are most frequent, but other common queries are searches for local businesses, map directions and traffic conditions, queries about news or sports, queries about trivial facts, and various other types of queries. Since each query can appear multiple times in a test set, and the order doesn't matter, an alternative representation, known as a bag, is to associate each unique query with a count. For example, the query "what's the weather" has a count of 3 in the set. Taking this one step further, each query can be given a real-valued weight (not just a frequency count) which represents its importance to the experimenter, relative to other queries. Such weights can be normalized to have a sum of 1.

Clouds and Devices

Figure 3:
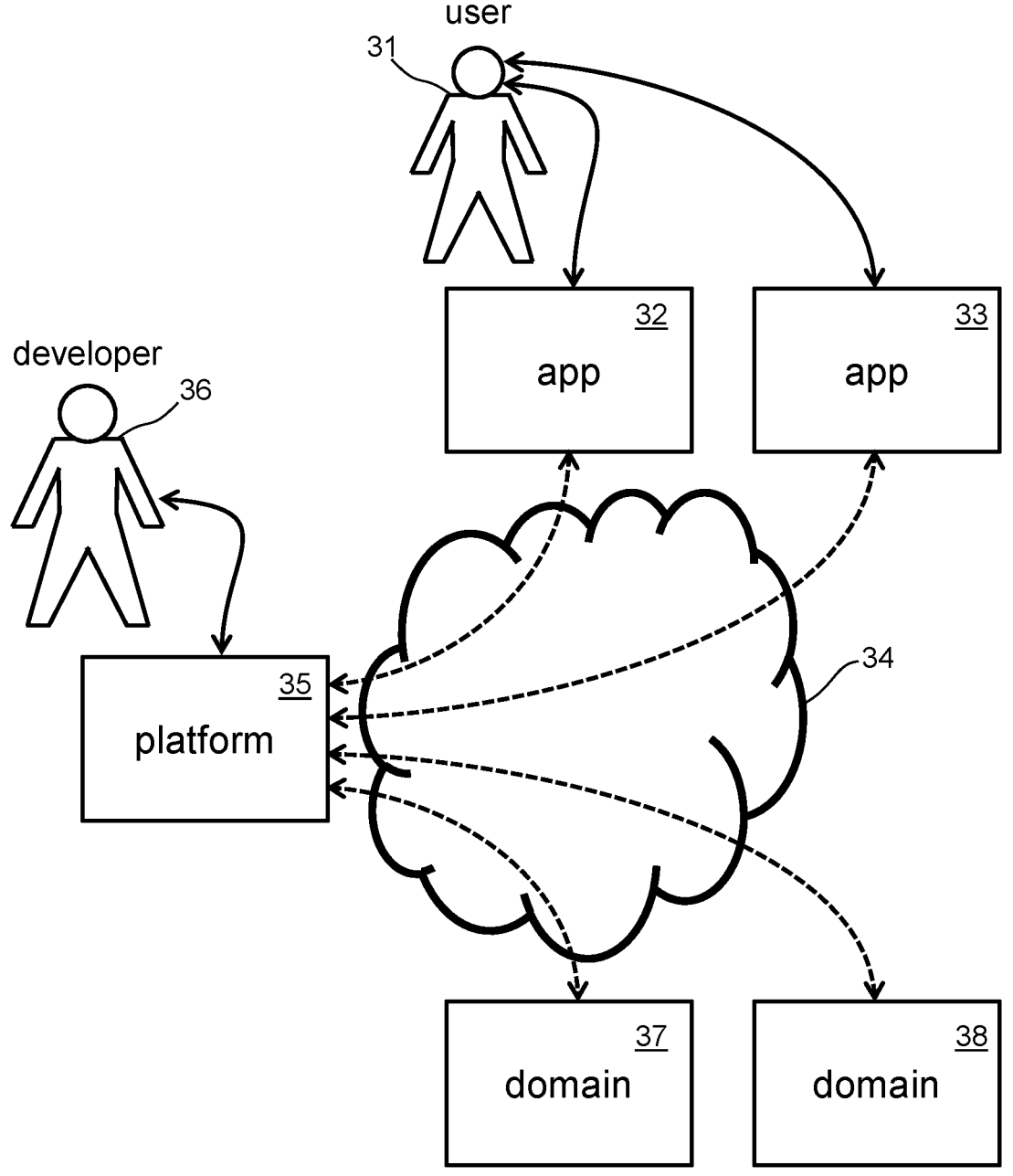
FIG. 3 shows a cloud-based system of domains, a platform, and virtual assistants, in an embodiment.

FIG. 3 shows a user 31 communicating with a first app 32 and a second app 33. The apps communicate through a network 34 with a platform 35. An app developer 36 previously used the platform 35 to configure a first virtual assistant for the first app 32 and a second virtual assistant for the second app 33. In some embodiments, different developers configure each app.

On the platform 35, a number of domains are available for selection in a configuration. The number of available domains can be in the hundreds, thousands or much more. Domains are provided by domain providers. They are made available on the platform through a domain registration or ingestion process. During registration, information supplied about the domain may include a unique ID, a simple name, a description, examples of recognized queries, and an executable or interpretable form of the domain, such as source code, object code, a neural network, or a semantic grammar. In the disclosure, the terms "grammar" or "semantic grammar" stand generically for the description of code such as source, object, neural network, or any data structure instance, that can be executed in order to parse or recognize queries.

The virtual assistant configuration created by the developer 36 includes the selection of a first domain 37 and a second domain 38. When the user 31 makes a query to either app, it sends the query to the platform 35, which interprets the query and retrieves appropriate information, using a web API, from either the first domain 37 or the second domain 38.

Figure 4:
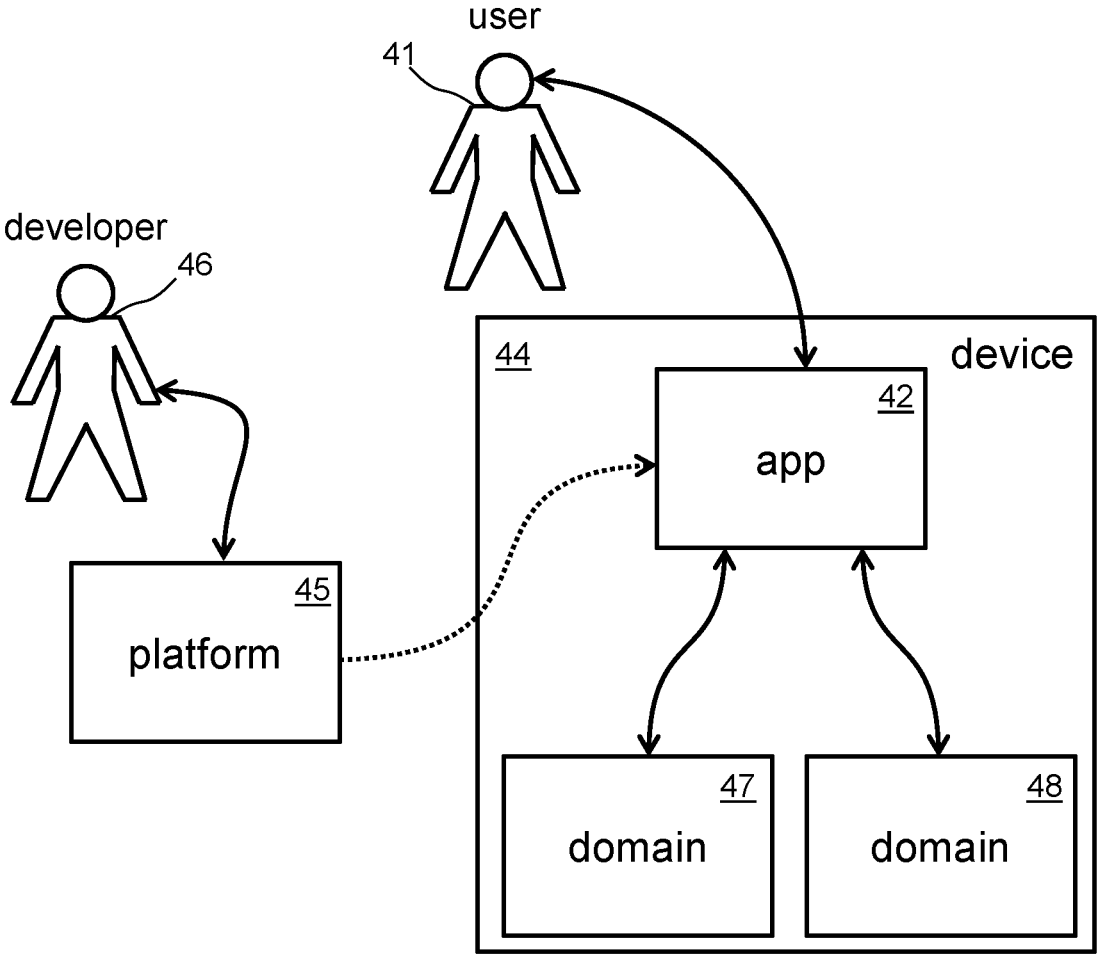
FIG. 4 shows a single-device system of domains, and a virtual assistant configured from a platform, in an embodiment.

FIG. 4 shows a user 41 communicating with an app 42 integrated within a device 44 that operates independently of a platform 45. The figure is not drawn to scale. An app developer 46 previously used the platform 45 to configure a virtual assistant for the app. The platform provided the software necessary for the app integrator to integrate the configured virtual assistant into the app 42.

When the app 42 receives queries from the user 41, it uses an integrated interpreter to interpret them and accordingly request information from a local information domain 47 or request a service action from a local service domain 48. In, for example, an automobile device, the information domain 47 would have a grammar and provide information for queries such as "how much battery power is left" and "what radio station is this". In an automobile, the service domain 48 would have a grammar and provide services such as "open the sunroof" and "turn up the radio". These example information sources and services are local to the automobile and do not require access to a network.

Some embodiments have configurations that enable a mix of domains that require network access and domains that do not. Such embodiments provide for the domains to respond successfully when network access is available and respond unsuccessfully when network access is unavailable.

Information Flow and Configuration

Figure 5:
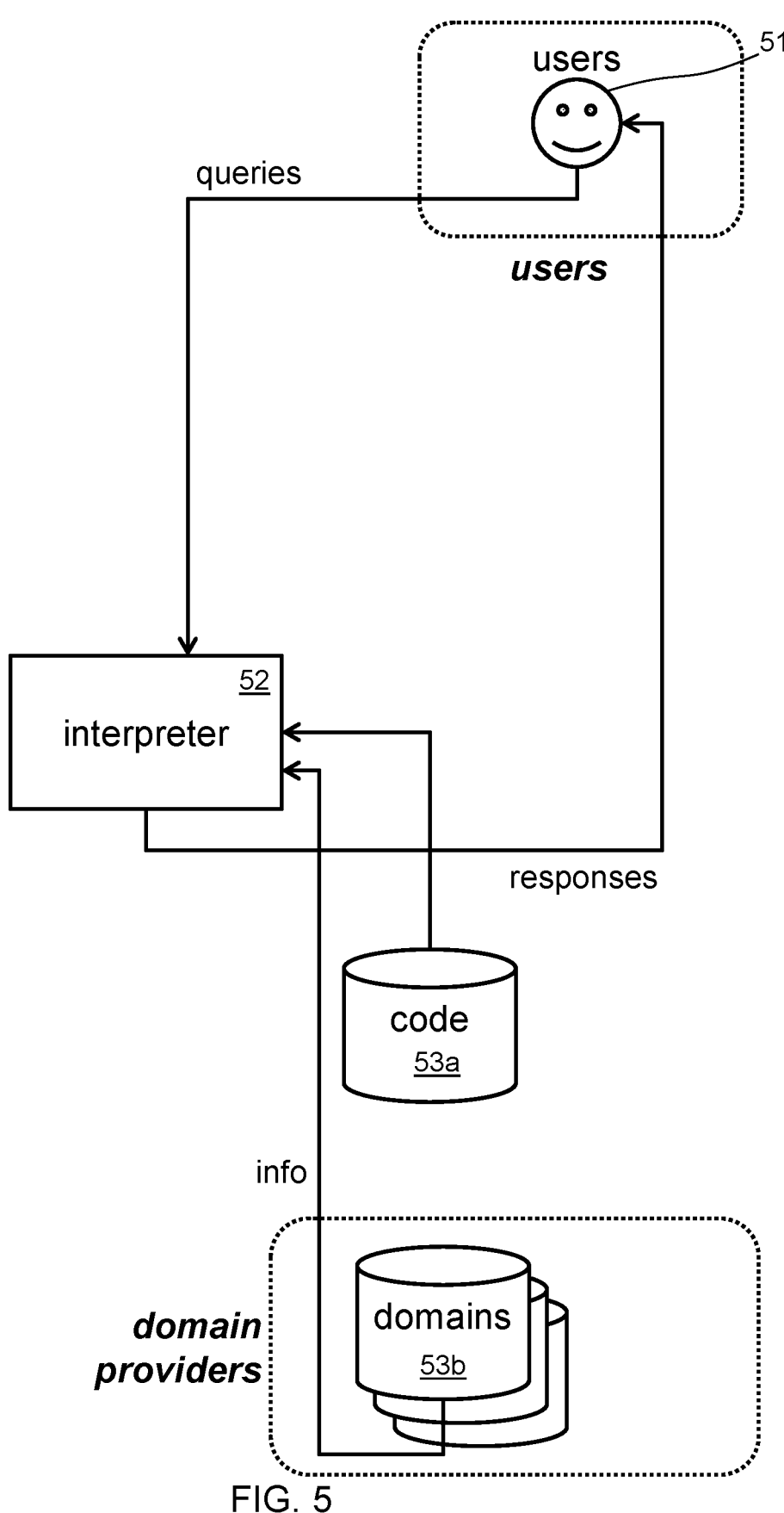
FIG. 5 shows a user interacting with a virtual assistant that interprets queries and provides responses according to domains, in an embodiment.

FIG. 5 shows a diagram of data flow through a platform at runtime according to an embodiment. Users 51 issue natural language queries for the platform to process. An interpreter 52 interprets the queries and provides responses to users 51. Depending on the query, a response could be a simple indication that the interpreter 52 could not interpret the query. In some embodiments, the interpreter 52 can, alone, provide responses to queries that it successfully interprets.

Domain providers provide data from their own servers such as music or other sources such as weather sensors or services such as sending messages or controlling a vehicle. Generically, such data or services are known as domains 53*b*. In order to know when users intend to invoke the domain, they can have corresponding grammar code 53*a*. The grammar code includes phrasings that invoke the domain and slots that can be filled with words from user expressions. For example, grammar code with the phrasing "what's the weather" invokes a weather domain and the domain code includes a slot for the location and time for which to retrieve a weather forecast. The code for the phrasings and slots of a weather domain enables an interpreter to know that the phrase "what's the weather in Timbuktu tomorrow" should perform a request to the domain provider for tomorrow's weather in Timbuktu. The code associated with domains is, in many embodiments, registered, ingested, and stored by the platform.

When the interpreter 52 interprets a query according to grammar code 53*a* associated with domains 53*b* and determines that the query requests information from the domain 53*b*, the interpreter 52 requests the information from the appropriate domain 53*b* provided by one of multiple domain providers. The interpreter 52 uses the information to form its response to a user 51.

Figure 6:
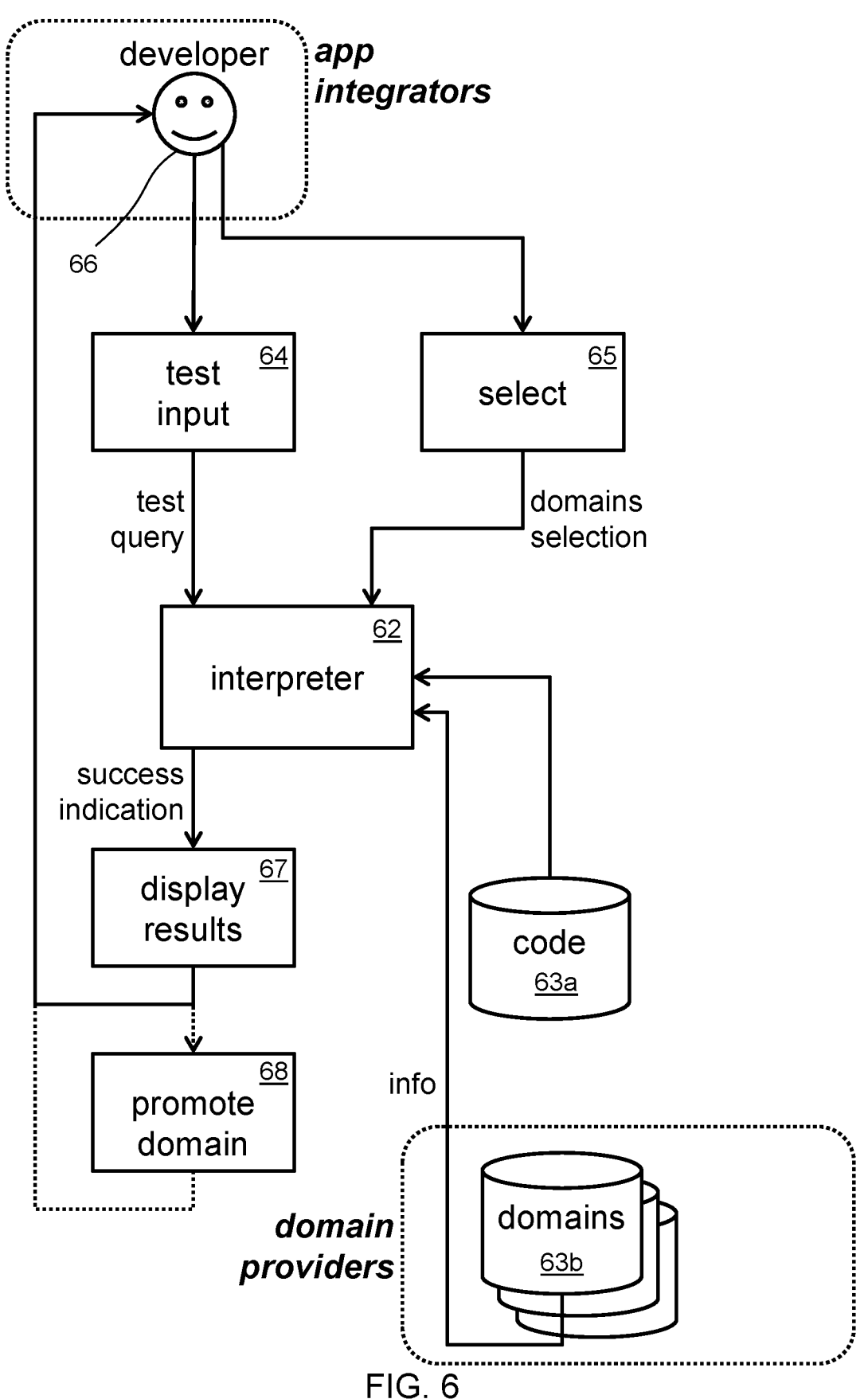
FIG. 6 shows a VA developer using test queries to guide the configuration of a natural language virtual assistant via a platform that promotes domains, in an embodiment.

FIG. 6 shows a diagram of data flow through a platform at configuration time according to an embodiment. A developer 66, from among many app integrators, provides one or more test query inputs 64 to the platform. The developer 66 also provides a selection of one or more domains 65. An interpreter 62 interprets the test queries according to the grammars code 63*a* of the selected domains 63*b* to determine whether any of the selected domains 63*b* can interpret the queries. A display displays 67 the results from the interpreter 62 to the developer 66. Many display views are appropriate and useful for various embodiments. Some display views will be illustrated and described below.

The embodiment of FIG. 6 further includes promoting one or more domains 68 based on the results of interpreter 62. For example, if a test query could be interpreted successfully according to a promotional domain, the platform shows the developer 66 the result that the interpreter would show to a user if the promotional domain is enabled. Some embodiments show the names of promotional domains even if they are not enabled. Some embodiments show the response that would be generated with information from the promotional domain as an alternative to the response that would be generated with information from the highest ranked of alternative domains.

For example, a weather domain provider with more accurate and detailed information might charge a higher price and offer itself as a promotional domain. A default weather domain might answer weather queries generally. The platform according to an embodiment would show the response according to information from the default weather domain and show the response that would be generated with information from the promotional weather domain. This can be done in conjunction with a suggestion to select the promotional domain and even a means to select, such as a button icon, the promotional domain for inclusion in the virtual assistant.

Figure 7:
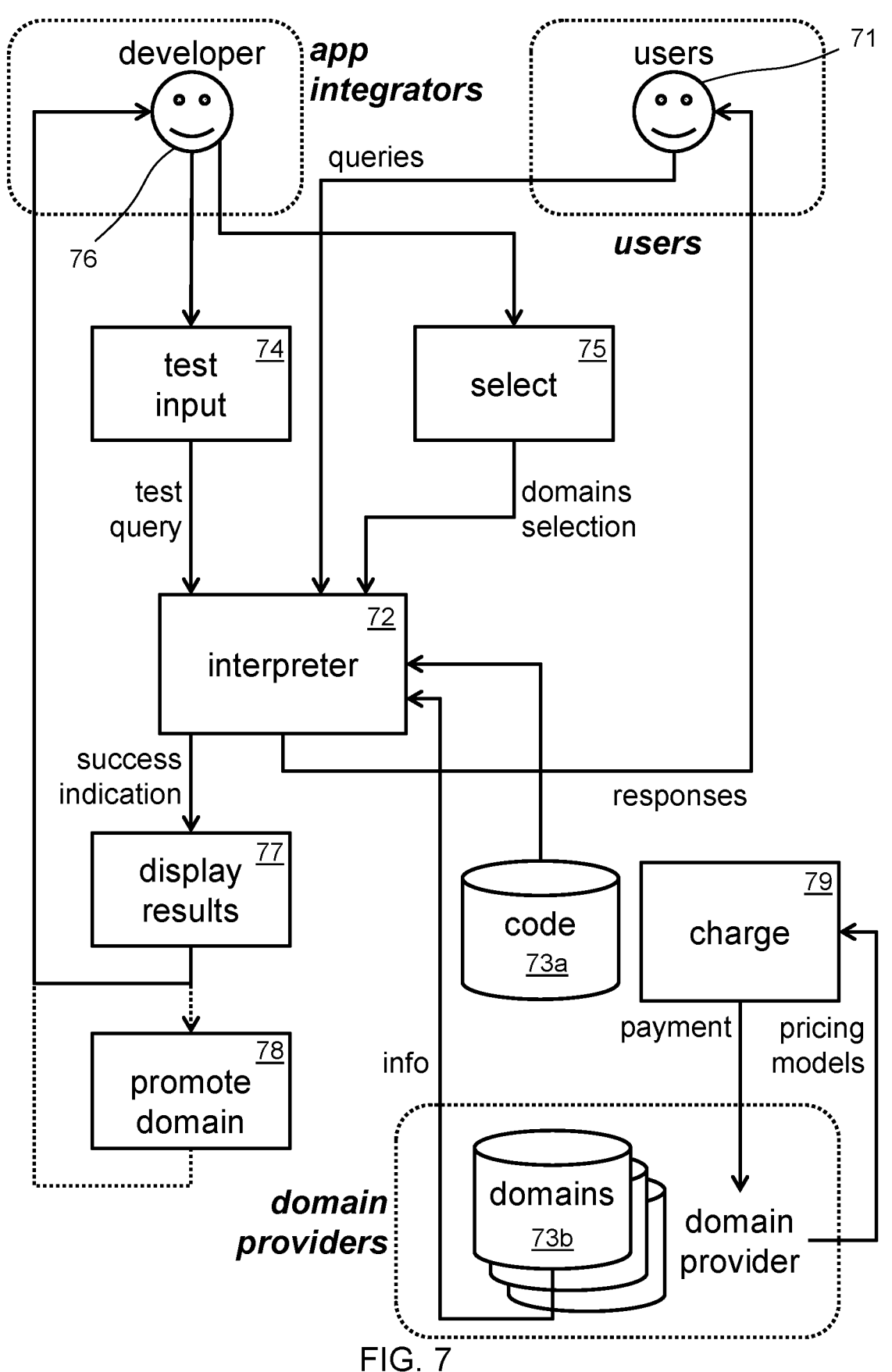
FIG. 7 shows a complete system with users querying, VA developers configuring, and domain providers providing information to users, in an embodiment.

FIG. 7 shows a diagram of data flow through a platform. A developer 76 provides one or more test query inputs 74 to the platform. The developer 76 also provides a selection of one or more domains 75. An interpreter 72 interprets the test queries according to the grammar code 73*a* of the selected domains 73*b* to determine whether any of the selected domains can interpret the queries. A display displays 77 the results of the interpreter 72 to the developer 76. The embodiment of FIG. 7 further includes promoting one or more domains 78 based on the results of the interpreter 72. After configuration time, during runtime, users 71 issue queries for the interpreter 72 to interpret and provide responses to users 71.

In the embodiment of FIG. 7, in response to receiving information from a domain 73, the platform computes a charge 79. The charge is computed according to a pricing model. A pricing model is a function based on the domain usage. Some embodiments have simple pricing models, such as a single charge for each information access. Such charges are usually a small fraction of one US dollar. Some embodiments support more complex pricing models that are functions based on the number of previous information accesses within a window of time or the types of information accessed. Equivalently, some domains charge for providing services as other domains provide information.

In the embodiment of FIG. 7, the platform provides a payment to each domain provider that provides information for the virtual assistant to compose responses to users. This creates an incentive for domain providers to want developers to choose their domains for inclusion in virtual assistants, and therefore an incentive for platform providers to promote the domains of domain providers with whom the platform provider has a close business relationship.

Domain Tables

Figure 8:
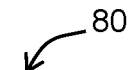
FIG. 8 shows a display of a menu of domains, providing for selecting which domains to enable, indicating how many of a set of test queries would be answered by each domain, showing their pricing models, and costs per domain for responding to the queries in the test set, in an embodiment.

FIG. 8 shows a display view of a domain table 80 according to an embodiment. Table 80 has one row per domain. The "enabled" column shows the state of domain enablement. In some embodiments, a cell in this column can be used to enable or disable the corresponding domain. Various input means are possible for selecting or deselecting domains, such as a mouse for clicking, a keyboard with arrow keys or shortcut keys, a touch screen, or other appropriate means for making selections of objects within a user interface.

Many different graphical layouts are possible. Generally, a grid is useful for visually organizing large numbers of domains as rows, and a relatively small number of columns to display relevant pieces of information about the domains, such as their names, whether they are enabled, the number or percentage of queries that they can interpret (out of a test set), and their pricing model (such as a cost per query in the simplest case). Visual objects showing associated information also work, such as rectangles representing domains aligned to a grid. It is also possible for objects to be dragged and dropped arbitrarily such as on the desktop of a personal computer.

Table 80 has a display view for showing VA developers which domains from a menu of domains are selected for including in a virtual assistant. The display view 80 has 5 columns. A heading row titles each column by its use. The columns are: the name of each domain listed from a menu of available domains; whether the domain is enabled for a virtual assistant; a count of the number of queries for which the domain is the one that the interpreter would select among all enabled domains that are able to interpret each query in a test set; a pricing model for responding to the queries; and a total cost for the domain to provide the information needed for the virtual assistant to provide responses when the domain is chosen to respond to each query in the test set.

Following the heading row is a row for each domain in the menu. Table 80 includes 7 domains in the menu. Some embodiments support much larger numbers of domains, variable numbers of domains, and domains that dynamically change as new and existing domain providers create or remove their offerings. The first column shows a text string with the name of each domain in the menu. The domains shown are weather, food, sports, map, facts, timer, and math.

The second column has a cell for each domain with a tick mark visible if the domain is selected for inclusion in the virtual assistant. FIG. 8 shows a pointer that can be controlled by a mouse or a finger on a touchscreen. A click or double click of a mouse button or a tap or double tap or long press of the finger changes the state of whether the domain at the pointer location is selected or not. The state is shown by the presence or absence of a tick mark in the cell.

The third column shows a cell for each domain, the cell containing a count for the number of queries responded to with information from the domain given the selected domains. In some embodiments, when correct query responses are known, different columns are used for a count of recognized queries and a count of correctly answered queries. In some embodiments, percentages are displayed instead, or in addition to absolute numbers using additional columns. Further, some queries are ambiguous with respect to the set of domains selected, i.e., they can be interpreted by more than one domain. This is most common for short queries. For example, a query, "turkey", can be interpreted by a weather domain, food domain, sports domain, map domain, a facts domain. Some embodiments handle ambiguous queries by providing labeled responses for all ambiguous interpretations of a query.

Other embodiments more forcefully eliminate ambiguity, using domain priorities and choosing the highest priority domain that matches a query. In another variant, query interpretation scores are used, and the domain with the highest scoring interpretation score from its corresponding grammar wins and forms the basis for a response. The two ideas can be combined. In all cases, ambiguity is eliminated by more forcefully choosing one or a small number of interpretations, which contribute to the count of a single domain. When the state of selection of a domain changes, this can change the number of queries that other domains would respond to. Some embodiments dynamically recalculate the query count number every time the selection of domains is modified. Alternatively, or in addition to the query count column of FIG. 8, some embodiments show both a total number of test queries for which each domain could provide information and an incremental number of test queries that could be answered correctly with the domain enabled.

The fourth column shows a pricing model for accounting for domain queries. Table 80 shows a simple kind of pricing model, based on a fixed price per query. Prices shown range from 0 (for a free domain) to 5¢ ($0.05 US dollars) per query. Some embodiments support more complex pricing models, such as piecewise linear or formula-based models as a function of the number of hits in a time window. Recurring time windows may be used (e.g., calendar months), as well as sliding time windows (e.g., the last 30 days). Embodiments that support more complex pricing models may not show the pricing model itself in a pricing model column; instead, a click or tap on the pricing model cell for a domain may give access to a different display view, such as a pop-up window, that shows the domain's pricing model and allows editing it.

A fifth column shows, for each domain, the amount of money that would be paid to the corresponding domain provider, based on the responses to every query in the test set of queries. A charge is made for every domain whose information is used in the response. For the simple pricing models shown in table 80, the domain cost for each domain is the query count times the cost per query. In embodiments that allow compound queries, a single query may hit multiple domains. For example, "what is the age of the president of the united states" might hit both a domain that provides political information and a domain that provides personal information. In embodiments that allow ambiguity in responses, a single query may hit multiple domains for a different reason. Multiple answers are given according to competing interpretations. For the same reason that the query counts can change every time a domain is selected or deselected, domain costs can also change accordingly.

The lowest complete row in table 80 represents the number of queries that match no domain. Such queries can be counted, but the other columns are not applicable.

Below that, a row lists two tallies. The first shows a percentage of queries that receive a response with the current selection of domains. In table 80, the food domain and the map domain are not enabled. They could each have responded to 1955 and 764 queries respectively. With those, and the 633 queries that could not be interpreted by any domain, 73% of the test queries successfully receive a response.

The final tally cell displays the total of the domain costs for the enabled domains. This number changes dynamically as a VA developer enables or disables domains. Generally, the more domains that a VA developer enables, the greater the query success will be and the greater the total cost will be. Since a higher query success rate generally provides a more satisfactory user experience, such a dynamically informative display view allows VA developers to make informed trade-offs between user satisfaction and budget for domain usage.

In all of the above methods, test queries or groups of test queries can be given multiplicities. Returning to FIG. 2, which shows a set of test queries, note for example that the query, "what's the weather" occurs 3 times. In a production environment, a VA developer might have access to field statistics over a much larger set of data, and the monthly count for "what's the weather" could be millions. Having large numbers of queries to the same domain makes nonlinear volume discounts a reasonable business arrangement. This is especially true if a platform caches results for data that is static or only changes at a low frequency. Alternatively, in the absence of full-blown statistics from the field, a small test set might be based: (1) on statistics from a small sample of queries; or (2) on a curated set of queries, perhaps inspired in part from data from the field. In either case, the test set counts can be multiplied by a variable factor, which the VA developer can vary to observe the effect of non-linear volume discounts.

Some embodiments, especially ones with large numbers of domains, provide a scroll bar to allow the VA developer to view different domains within a limited display space. Some embodiments allow VA developers to sort the list of domains according to the criteria of one or any number of columns. One way to do so is by receiving a click or tap on the column heading to cause the list to be sorted. Furthermore, a click on a column by which the list is already sorted causes the list to be sorted in the opposite order. Some embodiments provide a box for a VA developer to enter filter criteria, such as filtering the list of domains by: whether each domain is enabled or not; ranges of pricing models; and ranges of domain cost.

Every virtual assistant is a different project for a VA developer. In some embodiments, each project can be opened and viewed separately and will display domain tables specifically for the specific virtual assistant. Some embodiments of platforms let VA developers create accounts and log in to configure their virtual assistant projects. Platform administrators are able to control which domains are visible to different VA developers and what controls and tools a VA developer can access for working on a project as a function of the terms of the account.

Cost Stack Charts

Figure 9:
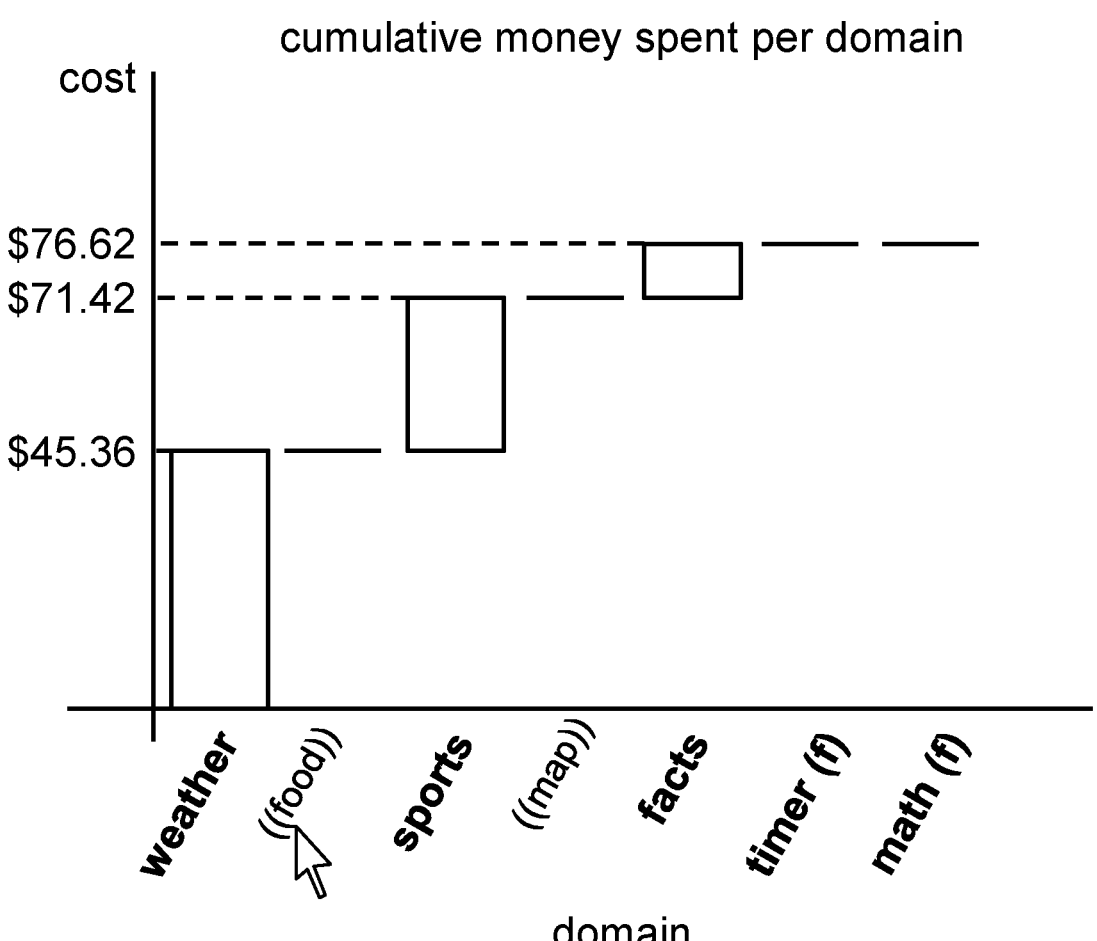
FIG. 9 shows a cost stack chart for a selection of enabled domains for a set of test queries, in an embodiment.

FIG. 9 shows a display view of a cost stack chart 90 according to an embodiment. The chart has the title "cumulative money spent per domain". The chart has a vertical axis for cost and a horizontal axis for domains. Some embodiments show domains along the vertical axis and costs along the horizontal axis. The former is generally better for virtual assistants in which a small number of domains account for most of the costs, whereas the latter is generally better for virtual assistants with large numbers of domains.

There are many useful ways to present visual data. For example, the books of Edward Tufte, such as *Envisioning Information* and *The Visual Display of Quantitative Information* are informative on the subject. Black and white line drawings are not ideal but can suffice for illustration. In the embodiment shown in the black and white line drawing of FIG. 9, seven domains are portrayed on the horizontal axis. To improve readability without overlapping words, the names of domains are written at an angle and right justified with the axis. The names of enabled domains are shown in a bold font and the names of disabled domains are shown between parentheses and written in a smaller font. Domains that are free of charge are indicated with an "(f)" after the domain name. Domains that require no access to external dynamic information are typically free, since the platform provider can cache the information and retrieve it at a low cost.

In the column for each domain, a bar with a height proportional to the domain cost for responding to the set of test queries indicates the domain's contribution to the total cost of responding to all the queries in the set. The bottom of the bar for each domain is placed at the height of the top of the previous domain's bar. Domains that have no cost have a zero-height bar, which appears as a horizontal line. The vertical axis is labeled with values of the cumulative cost and horizontal dashed lines at the height of the top of each bar, extending from the vertical axis to the bar at the label's height. The platform makes it easy for a VA developer to change the order of the domains by automatically sorting the available domains by various criteria, such as alphabetically by name; by the number of queries they match; by their cost per query; or their total cost. In addition, the platform's interface allows the user to freeze the order from a particular sort, while the selection changes and the order would otherwise vary. It is also possible to manually reorder domains. Some embodiments also provide for filtering the list of domains by various criteria, such as by showing only enabled domains, or selected disabled domains.

The display view of FIG. 9 also comprises a pointer that, if clicked or tapped or otherwise appropriately activated, toggles the state of whether a domain is enabled. Accordingly, a VA developer can quickly and easily enable and disable domains to see its effect on the total cost for responding to the queries in the test set. FIG. 10 shows a display view of a cost stack chart 100 for the same virtual assistant as that of FIG. 9, after the disabled food domain has been enabled by clicking with the pointer on ((food)).

In FIG. 10, domains are sorted by the number of queries that hit the domain. Although the food domain is a larger contributor to the total aggregate cost for responding to the test set (since it has a higher cost pricing model) than the weather domain, it is shown second in the list because the test set has fewer food queries than weather queries.

Some embodiments display the cost axis on a linear scale and some embodiments show it logarithmically. Some embodiments show an axis on the right side of the chart showing the cumulative number (or fraction or percentage of the test set) of queries responded to by the enabled domains. Such an axis would necessarily have an irregular scale if the costs scale is regular (linear or logarithmic). Alternatively, a regular (linear or logarithmic) display of queries responded to could have a corresponding parallel axis for cost with irregular spacing.

Query Hit Histograms

FIG. 11 shows a display view with a histogram of query hits per domain 110 according to an embodiment. The histogram has a title, "histogram of queries hitting domains" with a vertical axis of hits and a horizontal axis showing domains. A domain hit refers to a query that is responded to with information from the domain. The histogram 110 of FIG. 11 does not label the domain axis with the names of domains because there are too many domains to be able to fit the names. Alternatively, domains can be shown on a vertical axis and hits on a horizontal axis. If the histogram chart is long enough or allows a VA developer to scroll through its entries, it is possible to list names of domains and indicate numbers of hits.

The histogram 110 has a smoothed line, though a stairstep representation across domains would also work. Though histogram 110 does not label the horizontal axis with the names of domains, it shows a "$" symbol to indicate domains that have a pricing model above a threshold. In some embodiments, the threshold is zero (to indicate free and paid domains). Some embodiments provide for the VA developer to configure a threshold in order to see modestly priced versus high priced domains.

In some cases, domains with even a small number of hits can provide a disproportionate benefit to the user experience. For example, a domain available in an automobile virtual assistant that can locate a missing phone would be used rarely but would be very much appreciated by users in the rare instances that it is needed. It would be a strong selling point for the car. Even if accessing that domain information is very expensive, per usage, for the VA developers, it would be well worth the cost in order to sell more cars.

Some embodiments allow VA developers to tag certain domains, such as with a star symbol, as having a particularly high value to user experience. Some embodiments show a histogram as in FIG. 11 with high-value domains high-lighted with an outstanding color or icon.

Because many queries can be interpreted by more than one domain, enabling or disabling a single domain can change the number of queries responded to with information from all other domains. That can have the effect of reordering domains within the histogram. For example, if two competing weather domains are enabled and the first can provide all weather information including barometric pressure and the second is the default information source for all weather questions but cannot provide barometric pressure information then, with both domains enabled, the first will have a very small number of hits (and be shown near the right of histogram 110) but with the second domain disabled the first will have a very large number of hits.

Figure 12:
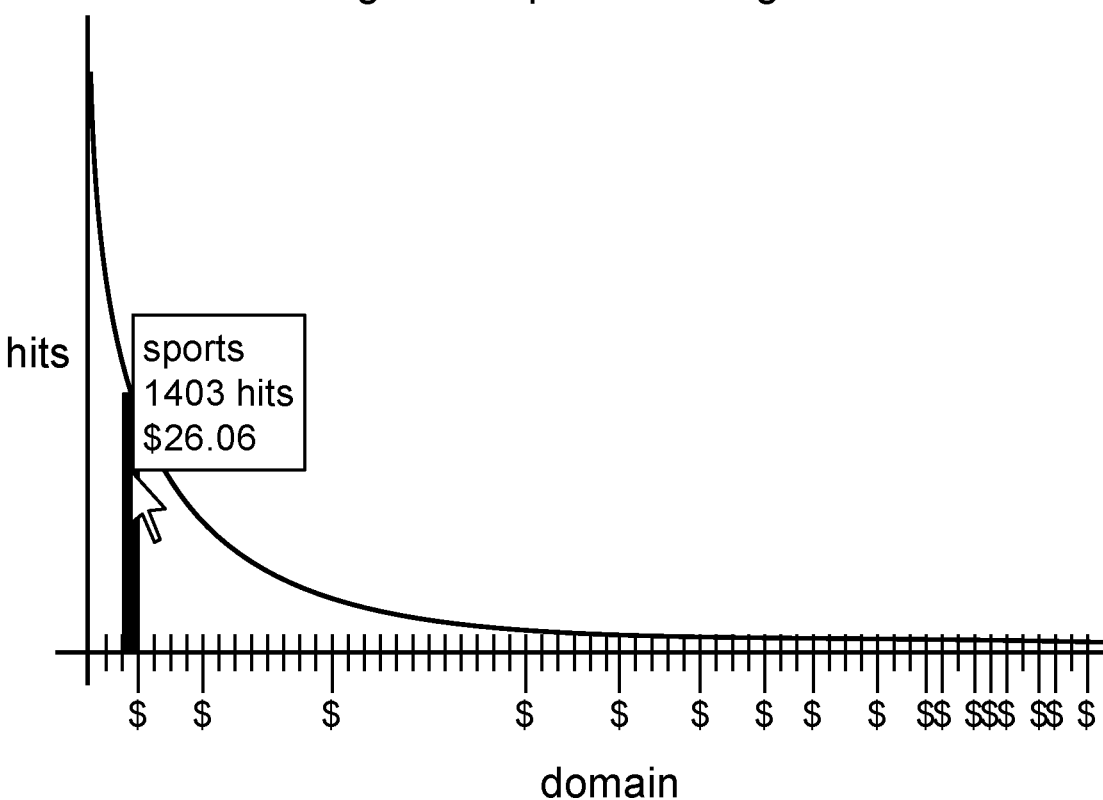
FIG. 12 shows a histogram of query responses per domains with one highlighted under a hovering pointer and showing domain-specific information, in an embodiment.

FIG. 12 shows the display view of histogram 110 as in FIG. 11 but with a pointer. When hovering above the column of a domain in the histogram, after 1 second without moving, the platform pops up an information box showing the name of the domain, the number of hits it has for the set of test queries, and the total cost for having the domain enabled when responding to the queries of the test set.

Domain Promotion

Figure 13:
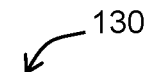
FIG. 13 shows a display of a menu of domains with a promoted domain shown prominently, in an embodiment.

FIG. 13 shows a display view with a domain table 130 according to an embodiment. Like the domain table 80 of FIG. 8, the domain table 130 of FIG. 13 lists domains. A difference is that the domain table 130 shows two map domains, one named "map", and another named "mapPRO". The latter is a promoted domain. It likely provides a superior user experience than the map domain at least because it can provide information for 805 instead of 764 queries of the test set. The platform shows the mapPRO domain and the text of its line in a bold font with a highlight around its enablement tick mark box. This makes the promoted domain appear prominently to VA developers to consider.

Though the embodiment of FIG. 13 uses a bold font and a highlighted box, numerous ways are possible for high-lighting a promoted domain. For example, one or more promoted domains can be: listed separately; sorted to be at the top of the list; shown using a different color or shading; shown with an icon such as a star, shown with an image such as a corporate logo; or animated. Some of these means of highlighting domains can be used in combination.

FIG. 14 shows a display view 140 for inputting specific test queries and seeing results according to an embodiment. The display view 140 comprises a text entry box 141. A virtual assistant developer can enter text using a physical keyboard or virtual keyboard or other appropriate text entry box. Entered text appears at the location of a cursor position indicator 142. For user interface devices that have a micro-phone, a VA developer can tap or click a microphone button 143 and speak a test query. A guidance item appears on the display when it is first invoked to inform the VA developer that it is possible to "speak your query".

Display view 140 also comprises an upload button 144. When activated, it invokes a dialog box for a user to browse for a file and select it to be uploaded to the platform. A file can contain a single query or a delimited list of any number of queries that comprise a complete test set. Some embodi-ments provide for a VA developer to drag and drop a file from their graphical operating system or browser display into the query box and have it automatically uploaded to the platform. Various implementations of upload buttons and drag-and-drop upload are well known and readily available in browser client-side script templates in languages such as Javascript.

Display view 140 further comprises a results box 145. For a given single input query, the results box displays a list of domains that can provide information needed to respond to the query with columns for the name of the domain, the pricing model (labeled "Cost"), and the response that the virtual assistant would give to a user for that query with the domain enabled. In some embodiments, multiple domain providers can offer source information and grammars to form very different responses to a query. The results box 145 shows virtual assistant responses using grammars and infor-mation from each of four travel domain providers. A "Trip Booker" domain has a relatively low cost (just 1¢ per query) but a response that is quite self-serving in that it mentions its own name, "Trip Booker" and recommends exactly one brand of hotel. Presumably, the Trip Booker domain pro-vider and the hotel brand have a paying business relation-ship. A "Travel Mate" domain has a mid-range cost (3¢ per query) and provides a fairly useful response indicating a large number of results available and a reasonable list of the top five most-likely interesting ones. A "TravelHound" domain has a high cost (8¢ per query) but provides by far the most useful result with a specific number of hotels found, a listing of a few, and an invitation for the user to get much more satisfactory results by sorting or filtering the list using an intuitive speech interface. A "Chee-po-tels" domain has a cheap cost (just 1¢ per query), but its grammar, instead of recognizing that the word Paris most likely refers to the large city in France, assumes a ridiculously small town in the rural US state of Idaho that has no hotels.

Regardless of the sort order of domains (such as pricing model, number of query hits, star selection by a VA devel-oper, query response type, etc.), a platform can show results in two sections. The first section, indicated by sub-heading 146 named "Editor's Picks—Sponsored", shows one or more domains that the platform provider prefers the VA developer to choose. Generally, "Editor's Picks" domains are ones sponsored by the domain provider or chosen by the platform provider because they encourage greater usage or satisfactory results by virtual assistants. The rest of the domains that can provide information to complete a response to the test query are shown in a section, indicated by a sub-heading 147 named "Other".

Pricing Models

The examples used above show uncommonly simplistic pricing models of a linear rate of one or several US cents per information request. In some embodiments, costs per request for information that is inexpensive to procure and deliver can be much lower than one US cent per request. FIG. 15A shows an example linear pricing model with a price of $0.0005 per request (equivalent to 0.05¢ per request).

It is common in the industry to use pricing models that are non-linear with respect to the number of queries for which the domain has the highest interpretation score. One example of a non-linear type of pricing model is a graduated pricing model. FIG. 15B shows such a pricing model. The cost per request decreases as the number of requests crosses thresholds. Specifically, the cost is $0.0010 per query for the first 10,000 queries within a month. For requests number 10,001 to 50,000, the cost is $0.0005 per request. For requests number 50,001 to 250,000, the cost is $0.0002 per request. For request number 250,001 and any others, the cost is $0.0001 per request. The query count resets once per month.

In some embodiments, a domain provider sends a monthly invoice to the platform provider for information requests served. In some embodiments, platform providers buy credits in advance of information requests. Charges for credits are set at graduated pricing intervals depending on the quantity purchased. In various embodiments, there can be various combinations of users subscribing, app integrators buying credits from platform providers or domain providers, any recipient paying by invoice, or any other appropriate method of paying for services.

FIG. 15C shows a non-linear formula-based pricing model. Rather than graduated intervals of large numbers of information requests, pricing per request is based on a formula. Many formulas are possible, but the formula in FIG. 16 is the following.

$$\$.0001 + \frac{\$.0025}{\log_{10}(\text{requests in the past 30 days})} \text{per request}$$

The platform provider or the domain provider or both maintain a count of information requests served over a sliding window of the past 30 days. The price per request is a minimum value of $0.0001 per request, plus a cost that varies inverse logarithmically with the number of requests. This effectively gives a volume discount to frequent users.

Various other non-linear pricing models are possible, limited only by the creativity of those who negotiate business contracts.

CRMs

Figure 16A:
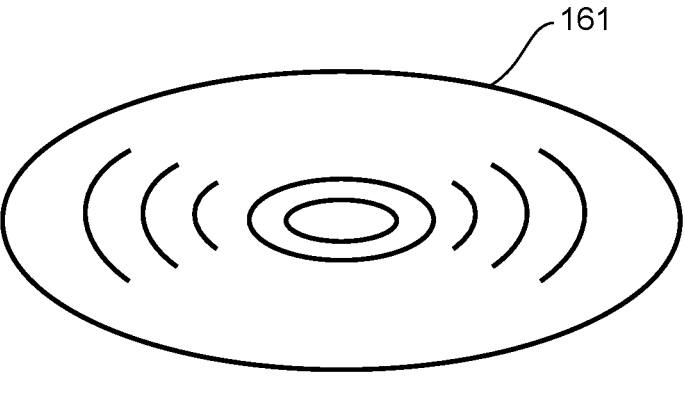
FIG. 16A shows a rotating non-transitory computer readable medium.

FIG. 16A shows an example non-transitory computer readable medium 161 that is a rotating magnetic disk. Data centers commonly use magnetic disks to store data and code comprising instructions for server processors. Non-transitory computer readable medium 161 stores code comprising instructions that, if executed by one or more computers, would cause the computer to perform steps of methods described herein. Rotating optical disks and other mechanically moving storage media are possible.

Figure 16B:
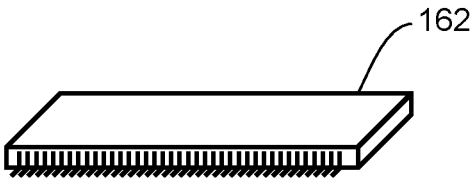
FIG. 16B shows a packaged solid-state non-transitory computer readable medium.

FIG. 16B shows an example non-transitory computer readable medium 162 that is a Flash random access memory (RAM) chip. Data centers commonly use Flash memory to store data and code for server processors. Mobile devices commonly use Flash memory to store data and code for processors within system-on-chip devices. Non-transitory computer readable medium 162 stores code comprising instructions that, if executed by one or more computers, would cause the computer to perform steps of methods described herein. Other non-moving storage media packaged with leads or solder balls are possible.

Any type of computer-readable medium is appropriate for storing code comprising instructions according to various embodiments.

The Server

Servers store databases of domains that are provided to VA developers in the platform menus. Servers also store databases of code for grammars associated with domains. Servers also store databases of pricing models associated with domains.

Figure 17A:
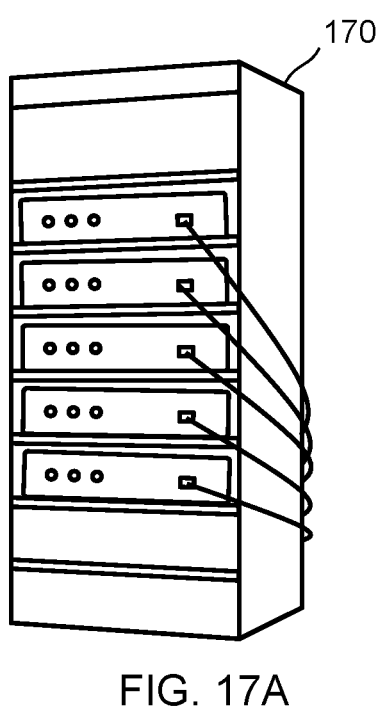
FIG. 17A shows a rack of servers.

FIG. 17A shows a rack-mounted server blade multiprocessor server system 170 according to some embodiments. It comprises a multiplicity of network-connected computer processors that run software in parallel.

Figure 17B:
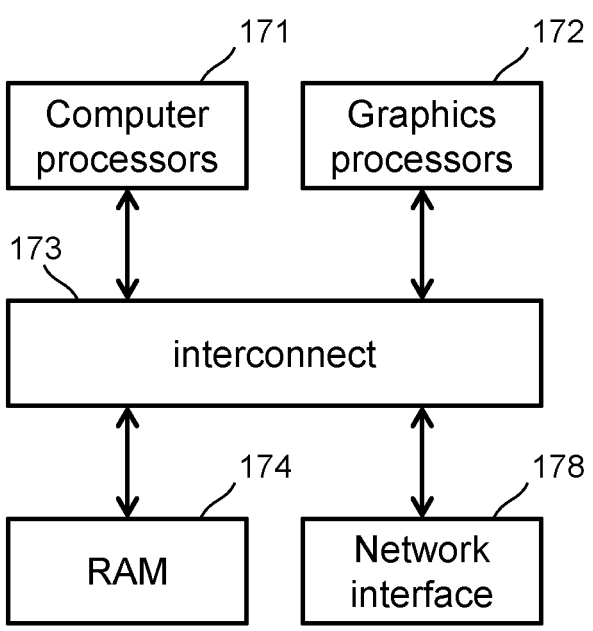
FIG. 17B shows a block diagram of a server.
Figure 18A:
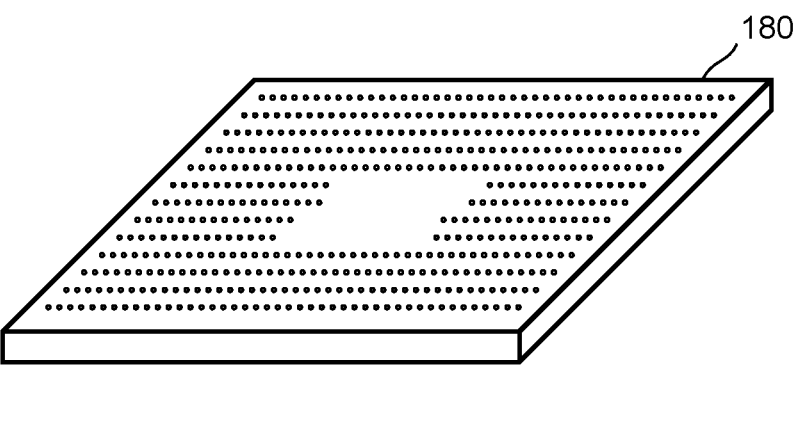
FIG. 18A shows a packaged system-on-chip.

FIG. 17B shows a block diagram of the server system 170. It comprises a multicore cluster of computer processor (CPU) cores 171 and a multicore cluster of graphics processor (GPU) cores 172. The processors connect through a board-level interconnect 173 to random-access memory (RAM) devices 174 for program code and data storage. Server system 170 also comprises a network interface 178 to allow the processors to access the Internet. By executing instructions stored in RAM devices 174, the CPUs 171 and GPUs 172 perform steps of methods as described herein. The SoC FIG. 18A shows the bottom side of a packaged system-on-chip device 180 with a ball grid array for surface-mount soldering to a printed circuit board. Various package shapes and sizes are possible for various chip implementations. System-on-chip (SoC) devices control many embedded systems and IoT device embodiments as described herein.

Figure 18B:
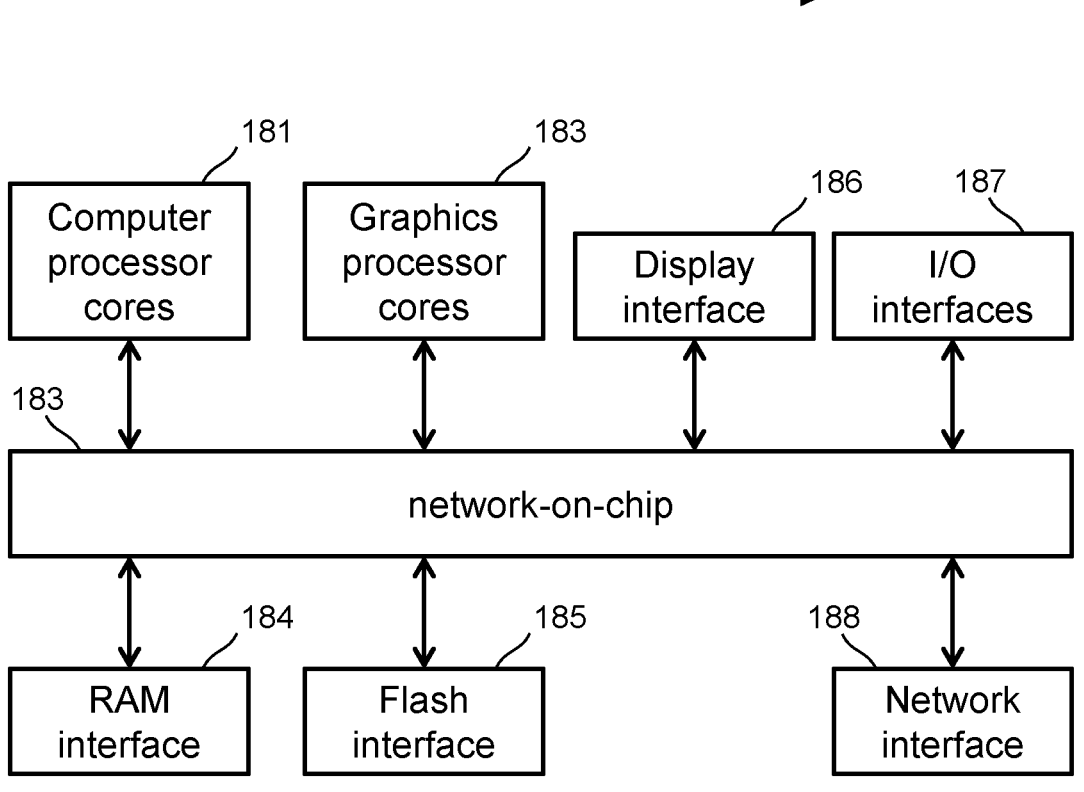
FIG. 18B shows a block diagram of a system-on-chip.

FIG. 18B shows a block diagram of the system-on-chip 180. It comprises a multicore cluster of computer processor (CPU) cores 181 and a multicore cluster of graphics processor (GPU) cores 182. The processors connect through a network-on-chip 183 to an off-chip dynamic random-access memory (DRAM) interface 184 for volatile program and data storage and a Flash interface 185 for non-volatile storage of computer program code in a Flash RAM non-transitory computer readable medium. SoC 180 also has a display interface 186 for displaying a GUI and an I/O interface module 187 for connecting to various I/O interface devices, as needed for different peripheral devices. The I/O interface enables sensors such as touch screen sensors, geolocation receivers, microphones, speakers, Bluetooth peripherals, and USB devices, such as keyboards and mice, among others. SoC 180 also comprises a network interface 188 to allow the processors to access the Internet through wired or wireless connections such as Wi-Fi, 3G, 4G long-term evolution (LTE), 5G, and other wireless interface standard radios as well as Ethernet connection hardware. By executing instructions stored in RAM devices through interface 184 or Flash devices through interface 185, the CPUs 181 and GPUs 182 perform steps of methods as described herein.

FURTHER CONSIDERATIONS

Practitioners skilled in the art will recognize many modifications and variations. The modifications and variations include any relevant combination of the disclosed features.

Various embodiments are methods that use the behavior of either or a combination of humans and machines. Method embodiments are complete wherever in the world most constituent steps occur. Some embodiments are one or more non-transitory computer readable media arranged to store such instructions for methods described herein. Whatever machine holds non-transitory computer readable media comprising any of the necessary code holds a complete embodiment. Some embodiments are physical devices such as semiconductor chips; hardware description language representations of the logical or functional behavior of such devices; and one or more non-transitory computer readable media arranged to store such hardware description language representations.

Descriptions herein reciting principles, features, and embodiments encompass both structural and functional equivalents thereof. Elements described herein as coupled have an effectual relationship realizable by a direct connection or indirectly with one or more other intervening elements.

Examples shown and described use certain spoken languages. Various embodiments operate, similarly, for other languages or combinations of languages. Examples shown and described use certain domains of knowledge. Various embodiments operate similarly for other domains or combinations of domains.

Some embodiments are screenless, such as an earpiece, which has no display screen. Some embodiments are stationary, such as a vending machine. Some embodiments are mobile, such as an automobile. Some embodiments are portable, such as a mobile phone. Some embodiments comprise manual interfaces such as keyboard or touch screens. Some embodiments comprise neural interfaces that use human thoughts as a form of natural language expression.

What is claimed is:

1. A computer-implemented method of selecting components for inclusion in configuring a virtual assistant, the method comprising, performing by a hardware processor, actions including:

receiving a multiplicity of test queries and a selection of a plurality of selected domains, wherein the selected domains have domain grammars that define semantic arguments expected in queries;

parsing each test query, using a neural network that has been trained based on example queries, the selected domains and the domain grammars that define the semantic arguments expected in the example queries, and deriving semantic arguments responsive to the domain grammars;

testing, for each interpreted test query, the selected domains that are able to respond to the semantic arguments derived from each interpreted test query;

evaluating responses from the tested domains, for highest rates of affirmatively responding to the semantic arguments from the interpreted test queries; and including in a build of the virtual assistant those selected domains having the highest rates of affirmative responses.

2. The computer-implemented method of claim 1, further comprising a step of including in the build of the virtual assistant to include a set of one or more domains having a rate of affirmative response below the highest rate, where the set of one or more domains having a rate of affirmative response below the highest rate offer incentives for inclusion into the virtual assistant.

3. The computer-implemented method of claim 1, further comprising a step of producing a histogram showing for each domain the number of interpreted test queries that were successfully responded to.

4. A computer-implemented method of selecting components for inclusion in a virtual assistant, the method comprising software running on a hardware processor:

receiving a multiplicity of test queries and a selection of a plurality of selected domains, wherein the selected domains have domain grammars that define semantic arguments expected in queries;

interpreting each test query, using a neural network that has been trained based on the domain grammars, and deriving semantic arguments responsive to the domain grammars;

testing, for each interpreted test query, the selected domains that are able to respond to the semantic arguments derived from each interpreted test query;

evaluating responses from the tested domains, for highest rates of affirmatively responding to the semantic arguments from the interpreted test queries; and including for a build of the virtual assistant those selected domains having the highest rates of affirmative responses.

5. The computer-implemented method of claim 4, wherein said step of interpreting each test query into the semantic arguments is performed for the plurality of domains using one or more algorithms associated with each of the domains.

6. The computer-implemented method of claim 4, further comprising a step of including in the build of the virtual assistant to include a set of one or more domains having a rate of affirmative response below the highest rate, where the set of one or more domains having a rate of affirmative response below the highest rate offer incentives for inclusion into the virtual assistant.

7. The computer-implemented method of claim 4, further comprising a step of producing a histogram showing for each domain the number of interpreted test queries that were successfully responded to.

8. A non-transitory computer readable medium holding instructions that, when executed on hardware, cause the hardware to carry out actions comprising:

receiving a multiplicity of test queries and a selection of a plurality of selected domains, wherein the selected domains have domain grammars that define semantic arguments expected in queries;

interpreting each test query, using a neural network that has been trained based on the domain grammars, and deriving semantic arguments responsive to the domain grammars;

testing, for each interpreted test query, the selected domains that are able to respond to the semantic arguments derived from each interpreted test query;

evaluating responses from the tested domains, for highest rates of affirmatively responding to the semantic arguments from the interpreted test queries; and including for a build of the virtual assistant those selected domains having the highest rates of affirmative responses.

9. The non-transitory computer readable medium of claim 8, the actions further comprising interpreting each test query using the neural network.

10. The non-transitory computer readable medium of claim 8, the actions further comprising interpretation of each test query into the semantic arguments being requested by the plurality of domains.

11. A non-transitory computer readable medium holding instructions that, when executed on hardware, cause the hardware to carry out actions comprising:

receiving a multiplicity of test queries and a selection of a plurality of selected domains, wherein the selected domains have domain grammars that define semantic arguments expected in queries;

parsing each test query and deriving one or more semantic arguments expected by the domain grammars;

testing, for each interpreted test query, the selected domains that are able to respond to the semantic arguments derived from each interpreted test query;

evaluating responses from the tested domains, for highest rates of affirmatively responding to the semantic arguments from the interpreted test queries; and including for a build of the virtual assistant those selected domains having the highest rates of affirmative responses.

12. The non-transitory computer readable medium of claim 11, wherein said action of parsing each test query into the semantic arguments is performed for the plurality of domains using one or more algorithms associated with each of the domains.

13. The non-transitory computer readable medium of claim 11, further comprising an action of including in the build of the virtual assistant to include a set of one or more domains having a rate of affirmative response below the highest rate, where the set of one or more domains having a rate of affirmative response below the highest rate offer incentives for inclusion into the virtual assistant.

14. The non-transitory computer readable medium of claim 11, further comprising an action of producing a histogram showing for each domain the number of interpreted test queries that were successfully responded to.

* * * * *